(No Model.)
L. G. MAYER.
VEHICLE.
No. 271,092. Patented Jan. 23, 1883.
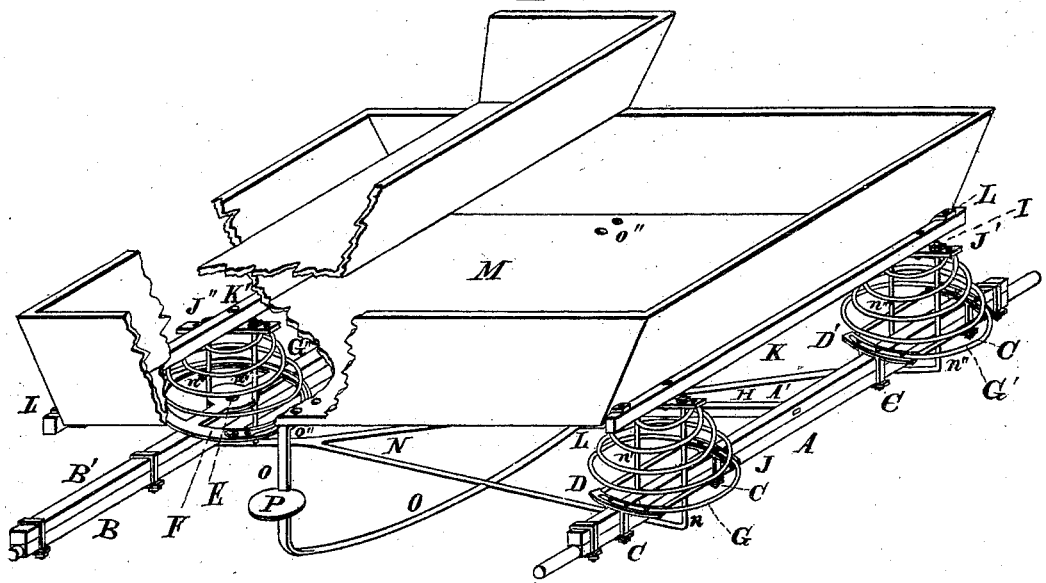
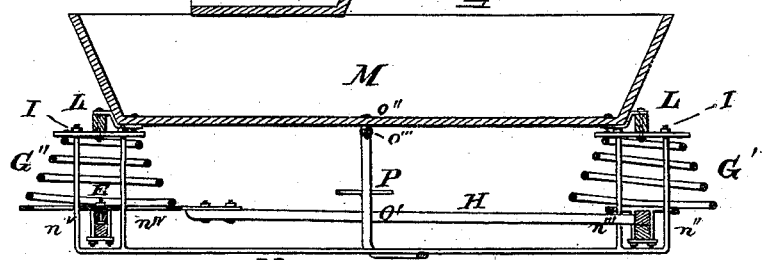
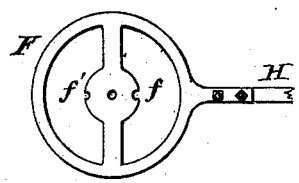 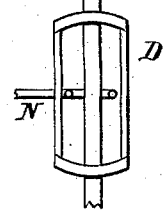
Attest
Carl Spengel
Wm J. Sayers
Inventor
Louis G. Mayer
by Knight Bros. Atty's
N. PETERS, Photo-Lithographer, Washington, D. C.

UNITED STATES PATENT OFFICE.

LOUIS G. MAYER, OF CINCINNATI, OHIO.

VEHICLE.

SPECIFICATION forming part of Letters Patent No. 271,092, dated January 23, 1883.

Application filed September 30, 1882. (No model.)

*To all whom it may concern:*

Be it known that I, LOUIS G. MAYER, of Cincinnati, Hamilton county, Ohio, have invented a new and useful Improvement in Vehicles, of which the following is a specification.

My invention relates to a new and useful mode or means of supporting the bed or body of a vehicle upon its running-gear, which is designed to secure greater compactness, lightness, and stability, together with greater ease to the occupant.

In the accompanying drawings, Figure 1 is a perspective view of my improvement and of so much of the contiguous parts of a vehicle as are necessary to be represented. Fig. 2 is a longitudinal section of the same. Figs. 3 and 4 are respectively plans of the two forms of spring bearing plate or bed employed for the rear and front of the vehicle, respectively.

A may represent the rear and B the front axle, and A' and B' their wooden "beds," of customary forms.

Secured to rear axle by clips C are two spring bed or bearing plates, D D', of the represented open oblong form.

Secured by king-bolt E to the front axle-bed is my front spring bed or bearing plate, F, of the represented open circular form.

Fastened to and resting upon the bed-plates D, D', and F are three spiral springs, G G' G'', of identical form. The convolutions of these springs are of decreasing diameters as they ascend, and said springs are at their upper extremities fastened to and support bars or plates J J' J'', which in turn are "clipped" or bolted to spars K K', that are fastened by body-loops L to and support the body M. Associated with these features is a member which I call the "equalizer," and which is constructed as follows:

N is a Y-formed brace, from which rise arms $n$ $n'$ $n''$ $n'''$ $n^{iv}$ $n^v$, that, straddling the axles in the manner shown, and rising through the spring-beds and springs and through the plates J, are secured by nuts I. The two front arms, $n^{iv}$ $n^v$, occupy notches $f f'$ in the spring bed-plate F. A perch, H, being tenoned at one extremity into the rear axle-bed, A', has its front extremity riveted or bolted to the bed-plate F of the front spring.

A brace, O, which is welded or otherwise rigidly fastened athwart the brace N, is bent upward at its extremities O' O', and again horizontally inward, as at O'', where it is secured to the body by nuts O'''.

Horizontal projections P from the portions O' O' serve the purpose of steps.

Some of the distinguishing characteristics of my improvement may be stated as follows: The front spring bearing-plate does duty as a fifth-wheel. The construction of the equalizer, (extending underneath the axles,) with its adjuncts, is such that a weight applied at any part—as, for example, one of the steps P— is borne by all of the three springs. The arms $n$ $n'$ $n''$ $n'''$ $n^{iv}$ $n^v$ in the spring bearing-plates D D' F, while permitting the sinking and rising of the bed, effectually prevent forward or backward pitching of the same. The cross-brace O of the equalizer is utilized as a place of attachment for steps. The spiral springs afford a cheap, light, elegant, and easily-replaceable means of securing the desired resilience of the body. Even in the event of the loss or breakage of the king-bolt, the running-gears could not separate, because the equalizer would hold them temporarily together with sufficient strength to prevent accident to the vehicle or danger to its occupants.

While preferring the spiral form shown for the springs, I reserve the right to give their convolutions a helical form or that form known as "hour-glass"—to wit, wide at the ends and narrowed toward the middle.

I claim as new and of my invention—

1. In a spring-vehicle, the Y-shaped equalizer N, having the uprights $n$ $n'$ $n''$ $n'''$ $n^{iv}$ $n^v$ and nuts I, in combination with the spring bearing-plates D D' F and plates J J' J'', substantially as set forth.

2. A spring-vehicle whose body is supported on three spiral springs, C C' C'', resting upon and attached to bearing-plates D D' F, of which plates D D' are attached rigidly to the rear axle and plate F by king-bolt E to front axle, substantially as set forth.

3. In a spring-vehicle, the combination of body M, body-loops L, spars K K', plates J J' J'', spiral springs G G' G'', bearing-plates D D' F, and equalizer N, substantially as set forth.

4. In the described combination with equalizer N, the rigidly-attached cross-brace O, secured by nuts O''' to the bed M.

5. The combination, with equalizer N, of rigidly-attached cross-brace O, having the attached steps P.

In testimony of which invention I hereunto set my hand.

LOUIS G. MAYER.

Attest:
GEO. H. KNIGHT,
SAML. S. CARPENTER.